United States Patent

Schoeley et al.

[11] Patent Number: 5,969,057
[45] Date of Patent: Oct. 19, 1999

[54] ADHESIVE RTV SILICONE RUBBER COMPOUNDS

[75] Inventors: Peter Schoeley, Nuenchritz; Gisela Liesch, Riesa; Cornelia Sczepanski, Nuenchritz; Ulrich Michel, Sankt Augustin, all of Germany

[73] Assignee: Huels Silicone GmbH, Nuenchritz, Germany

[21] Appl. No.: 08/845,925

[22] Filed: Apr. 28, 1997

[30] Foreign Application Priority Data

Apr. 26, 1996 [DE] Germany ............................ 196 16 789

[51] Int. Cl.⁶ .......................... C08L 83/04; C09J 183/04; C09J 183/06
[52] U.S. Cl. .......................... 525/474; 525/475; 525/477; 528/30; 528/33; 528/34; 528/35; 528/43
[58] Field of Search .................................. 528/30, 33, 34, 528/35, 43; 525/474, 477

[56] References Cited

U.S. PATENT DOCUMENTS

| | | | |
|---|---|---|---|
| 4,074,001 | 2/1978 | Imai et al. | 428/329 |
| 5,037,878 | 8/1991 | Cerles et al. | 528/14 |
| 5,851,594 | 12/1998 | Feder et al. | 427/387 |

FOREIGN PATENT DOCUMENTS 41 43 203 A1   7/1993   Germany .

*Primary Examiner*—Jeffrey C. Mullis
*Attorney, Agent, or Firm*—Oblon, Spivak, McClelland, Maier & Neustadt, P.C.

[57] ABSTRACT

Adhesive room temperature vulcanizing silicone rubber compositions based on polydiorganosiloxanes, which cross-link by means of condensation are good adhesives. The compounds contain, in addition to the conventional components, the combination of at least one hydrolyzable alkylsilalne and at least one branched polysiloxane.

10 Claims, No Drawings

ADHESIVE RTV SILICONE RUBBER COMPOUNDS

BACKGROUND OF THE INVENTION

1. Field of the Invention

The invention relates to adhesive room temperature vulcanizing (RTV) silicone rubber compositions (also called "compounds" herein) based on polydiorganosiloxanes, which cross-link by means of condensation, the compounds containing, in addition to the conventional components, the combination of at least one hydrolyzable alkylsilane and at least one branched polysiloxane.

2. Discussion of the Background

There exist silicone rubber compounds that vulcanize to elastomers at room temperature. They contain in general a cross-linkable polymeric, usually linear siloxane, a compound that has a vulcanizing effect, a catalyst and optionally other additives, like plasticizers, bonding agents, pigments, processing agents and fillers.

The very good adhesive properties of silicone rubbers are not always advantageous, since frequently a strong adhesion of the silicone on different substrates is to be achieved. Therefore, one uses so-called bonding agents, which are either integrated into the silicone rubber compound or are applied on the substrate as primer. Normally these bonding agents comprise one or several monomeric silanes, which exhibit functional groups bonded on the silicon via carbon. There also exist compounds that have the effect of a bonding agent and that are obtained through the reaction of different bonding agents.

Technically preferred is the integration of the bonding agents into the silicone rubber compounds, thus saving the additional step of applying the bonding agent. However, one important problem for the stability of the adhesive shear strength of such adhesive bonds or sealants lies in the fact that, on the one hand, the adhesion of the silicone on the substrate and, on the other hand, the vulcanizate strength, for example at elevated temperatures and subject to the simultaneous effect of moisture, declines very rapidly. Within a short period of time the result is a significant reduction of the technical service life of the combination silicone and substrate.

According to the DE 23 01 547 a combination of aminopropyl triethoxysilane and glycidoxypropyl trimethoxysilane or analogous alkoxysilanes with amino groups and epoxide groups are used for an adhesive bond of silicone with glass. EP 178 751 describes the integration of these compounds into the silicone rubber compound. These systems have the drawback that with a tensile load on such an adhesive bond following simultaneous stress by temperature and humidity (hot water storage) the adhesion tears.

Several methods have been tried to avoid this decrease in strength. Thus, the addition of colophonium esters in the form of a solution in toluene is described in the EP 540 540. JP 3 017 158 teaches the use of calcium carbonates coated with colophonium, thus necessitating an additional treatment of the fillers.

SUMMARY OF THE INVENTION

Therefore, one object of the invention is to provide adhesive silicone rubber compounds that vulcanize at room temperature and that provide early load-bearing strength of the bonded joint (adequate adhesive and cohesive strength after a few hours of curing) and excellent hot water stability of the adhesive bonds.

The adhesive RTV silicone rubber compounds based on polydiorganosiloxanes, which cross-link by means of condensation, contain, according to the invention, (a) at least one organosilicon compound of the general formula $$R_a R^1_b SiX_{4-(a+b)} \quad (I),$$

where each R stands for, independently of one another, substituted and/or nonsubstituted, saturated and/or unsaturated, monovalent hydrocarbon groups having 1 to 10 carbon atoms; each $R^1$ stands for, independently of one another, substituted and/or nonsubstituted, saturated and/or unsaturated linear, branched and/or cyclic hydrocarbon groups having at least 3 carbon atoms; X denotes a hydrolyzable group; a assumes values from 0 to 2; and the sum (a+b) assumes values from 1 to 3; and/or their partial condensates and (b) at least one organosilicon compound of the general formula $$(SiO_{4/2})_x(R^3SiO_{3/2})_y(R^3_2SiO_{2/2})_z(R^3_3SiO_{1/2})_w \quad (II),$$

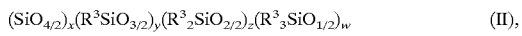

where each $R^3$ denotes, independently of one another, R and/or OR and/or OH; and the sum (x+y+z+w) assumes values greater than 2, and/or (c) the product, obtained by reacting at least one compound of the general formula (I) with at least one compound of the general formula (II).

Normally 0.1% by wt. to 30% by wt. of the compound (a) and (b) and/or (c), based on the total mixture, are contained in the adhesive silicone rubber compound. Preferably a combination of 1.0 to 3.5% by wt. of (a) and 1.5 to 4.0% by wt. of (b) or 1.0 to 5.0% by wt., based on the total mixture, is used.

The organosilicon compounds of the general formula (1) preferably contain $R^1$ groups having 3–20 carbon atoms, for example, octyl, cyclohexenyl and/or isobutyl groups but also other alkyl groups, which can be linear, branched or cyclic, as well as substituted or nonsubstituted alkenyl, allyl, cycloalkyl or cycloalkenyl, aryl, alkylaryl or arylalkyl groups. Preferably compounds of the general structure $R^1Si(OR^4)_3$ are employed, where $R^4$ stands for hydrocarbon groups having 1 to 4 carbon atoms. Examples are octyltriethoxysilane, iso-butyl trimethoxysilane or cyclohexenyl ethyl triethoxysilane.

The organosilicon compounds of the general formula (II) are low to high molecular weight branched polysiloxanes. They preferably contain units of the structure $(R^1SiO_{3/2})$ (T units) and units of the structure $(R^3_2SiO_{2/2})$ (D units), where in the general formula (II), x and w equal 0 and y assumes preferably values between 2 and 100 and z assumes values between 0 and 80. or consist of units of the structure $(R^3_3SiO_{1/2})$ (M units), $(SiO_{4/2})$ (Q units) and $(R^3_2SiO_{2/2})$ (D units), where in the general formula (II) y equals 0, x assumes values between 2 and 100, z assumes values between 0 and 50, and w assumes values between 1 and 200. Preferably $R^3$ groups are phenyl, methyl, ethyl or vinyl groups.

The added polysiloxanes can be introduced in different ways into the silicone rubber compound, for example, in the pure form either in the liquid or solid state, but also dissolved in an organic solvent or in one of the compounds used in the general formula (I), preferably in an organotrialkoxysilane.

Furthermore, it is possible to use a reaction product from the organosilicon compound of the general formula (I) with the organosilicon compound of the general formula (II), produced in the presence of a catalyst. In so doing, the catalyst that is also added as the vulcanizing catalyst in the silicone rubber compound, usually an organic metal or nitrogen compound, is used advantageously as the catalyst.

RTV silicone rubber compounds contain as the conventional components:

(i) 3 to 90% by wt. of at least one polydiorganosiloxane, which can be vulcanized through condensation and has the general formula

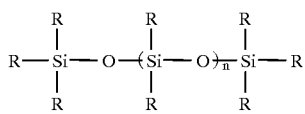 (III)

where R has the aforementioned meaning or denotes OR or OH provided, that on average each molecule contains at least one hydrolyzable group, and n assumes a value between 5 and 50,000, (k) 1 to 10% by wt. of at least one cross-linker of the general formula $$R_a R^5_b SiX_{4-(a+b)}$$ (IV), where R has the aforementioned meaning, $R^5$ stands for hydrocarbon groups having 1 to 6 carbon atoms and X stands for a hydrolyzable group; and a assumes the aforementioned values, and/or their partial condensates, (l) 0.02 to 5% by wt. of at least one bonding agent of the general formula $$R^1_c R^6_d SiOR^1_{4-(c+d)}$$ (V), where $R^1$ has the aforementioned meaning, $R^6$ contains at least one Si—C bonded group having an adhesion-promoting group, such as amino, epoxy, mercapto or acrylate group, and c assumes the values 0 to 2, d is either 1 or 2, and the sum (c+d) is not greater than 3, and/or their partial condensates, (m) 0.01 to 3% by wt. of at least one compound catalyzing the reaction of the components (i) to (l).

(n) 5 to 50% by wt. of at least one treated and/or untreated filler as well as optionally (o) other conventional additives.

Preferably silanol- and/or alkoxy-terminated polydiorganosiloxanes are added as compound (i), where methyl and/or vinyl groups are especially preferred as the organo groups. Other organo groups can be: alkyl, alkenyl, allyl, cycloalkyl, aryl, alkylaryl, arylalkyl or halogenated hydrocarbon groups, such as 1,1,1-trichloroethyl, 3A-chloro-n-propyl, 3,3,3-trifluoro-n-propyl, 2,2,2,2',2',2'-hexafluoro-iso-propyl or chlorophenyl groups.

Examples of crosslinkers (k) are one or several organosilicon compounds, which are the equivalent to the average formula $$R_m SiX_{4-m}$$ (VI), where each R denotes, independently of one another, substituted and/or nonsubstituted, saturated and/or unsaturated, monovalent hydrocarbon groups having 1 to 6 carbon atoms; and X denotes a hydrolyzable group; and m assumes at most the value 1.9; and/or their partial condensates.

Examples of such compounds are tetrapropoxy-, -ethoxy-, -methoxysilanes or diamidodialkylsilane.

Conventional bonding agents (l) are, for example, aminopropyl triethoxysilane and glycidoxypropyl trimethoxysilane or mixtures thereof. However, silanes with several amino or other alkoxy groups or silanes with other functional groups can also be used as bonding agents.

Normally organic tin or titanium compounds or amines are employed as catalysts for the reaction of components (i) to (l).

The silicone rubber compound may contain as filler (n), for example, calcium carbonates, fumed silica, silicates, metal oxides or metal hydroxides, carbon blacks, sulfates or zirconates.

Other additives (o) can be, among others:
plasticizers, like nonreactive silicone fluids or organic compounds—stabilizers
pigments.

One or two component silicone rubber compounds are formulated on the basis of components (i) to (o), where the compound is produced continuously or discontinuously according to conventional methods. However, for the production of silicone rubber compounds, which yield rapidly adhering vulcanizates with a high hot water stability, these known recipes are only inadequately suitable. Only with the RTV-2-silicone rubber compounds of the invention that contain the components (a) and (b) and/or (c) can qualitatively high grade compounds be formulated.

It was totally surprising that through the use of the combination of a branched polysiloxane with a hydrolyzable alkylsilane, which exhibits at least one hydrocarbon group having more than 3 carbon atoms, one can make available a rubber compound that vulcanizes rapidly to a mechanically loadable material and is highly suitable as an adhesive or sealing material. In addition, the compounds according to the invention provide a high strength silicone rubber/glass combination even when the adhesive bond is stored in hot water for a prolonged period.

EXAMPLES

Other features of the invention will become apparent in the course of the following descriptions of exemplary embodiments which are given for illustration of the invention but are not intended to be limiting thereof. All quantities are given in parts by weight (p/w). Viscosity data are based on 25° C.

Base Compound I
70 p/w polydiorganosiloxane with hydroxyl end groups
  Viscosity 10,000 mPas
2 p/w polydiorganosiloxane with hydroxyl end groups
  Viscosity 100 mPas
30 p/w polydiorganosiloxane with trimethyl silyl end groups
  Viscosity 100 mPas
100 p/w calcium carbonate, precipitated and coated with stearic acid Base Compound II
90 p/w polydiorganosiloxane with hydroxyl end groups
  Viscosity 10,000 mPas
2 p/w polydiorganosiloxane with hydroxyl end groups
  Viscosity 100 mPas
10 p/w polydiorganosiloxane with trimethyl silyl end groups
  Viscosity 100 mPas
10 p/w calcium carbonate precipitated and coated with stearic acid Following the addition of the appropriate cross-linking system to the compounds I or II, the rubber test piece was produced in accordance with DIN 28340 (bonding of 2 glass strips).

In the cross-linking system the tin compound stands for the reaction product from dibutyl tin dilaurate and tetraethoxysilane; OCTEO stands for octyltriethoxysilane; and TPOS, for tetrapropoxysilane.

The test piece was stored for seven days at room temperature (50% atmospheric humidity) and subsequently 14 days in 70° C. hot water (HWS). The test pieces showed a stress value of 25% at a given elongation of the test piece (stress 25%) and the tensile strength (TS). In all of the examples of the invention cohesion cracks (fissuring of the silicone rubber) were observed. In comparative example 4 the adhesion cracked (separation of the rubber from the glass).

Examples 1 to 4
Variation of the Bonding Agent

The cross-linking system was obtained by mixing the components

A)—Reaction product of aminopropyl triethoxysilane (AMEO) with glycidoxypropyl trimethoxysilane (GLYMO) in the desired ratio at 80° C., B)—Polysiloxane (silicone resin comprising $MeSiO_{3/2}$ units, molecular weight approx. 9,500 g/mol) dissolved in OCTEO, and C)—Reaction product of dibutyl tin dilaurate (DBTL) with tetraethoxysilane at a molar ratio of 2:1 (heating of mixture for more than one hour at 160° C.).

The cross-linking system was mixed into base compound I.

Table I contains the exact cross-linking composition and the results.

TABLE I

| | Example 1 | Example 2 | Example 3 | Comparative Example 4 |
|---|---|---|---|---|
| Cross-linking components in parts by weight | | | | |
| TPOS | 4 | 4 | 4 | 4 |
| Tin compound | 2 | 2 | 2 | 2 |
| AMEO | 12 | 9 | 4 | 7.5 |
| GLYMO | 12 | 15 | 6 | 7.5 |
| OCTEO | 28 | 28 | 28 | — |
| Polysiloxane | 42 | 42 | 42 | — |
| Addition to base compound I in % by wt. | 10 | 10 | 8.6 | 2.1 |
| Parameters | | | | |
| Stress 25% after 24 hours in MPa | 0.55 | 0.46 | 0.23 | 0.50 |
| TS after 7 days in MPa | 1.03 | 1.08 | 0.98 | 0.85 |
| TS after HWS in MPa | 0.74 | 0.84 | 0.83 | 0.20 |

The table shows that the addition of OCTEO and polysiloxane, as compared to the conventional comparative composition (example 4), raises not only the hot water stability, but also in the case of a higher ratio of bonding agent, the early mechanical loading capacity of the bonded unit (stress value 25% after 24 hours>0.3 MPa).

Examples 5 to 8
Variation of the Alkyl Alkoxysilane

These examples are cross-linking systems analogous to examples 1 to 4, but instead of OCTLO, different alkoxysilanes (28 parts by weight at a time) were added.

Table 2 contains the exact cross-linking composition and the results.

TABLE 2

| | Comparative Example 5 | Example 6 | Example 7 | Example 8 |
|---|---|---|---|---|
| Cross-linking components in parts by weight | | | | |
| TPOS | 4 | 4 | 4 | 4 |
| Tin compound | 2 | 2 | 2 | 2 |
| AMEO | 9 | 9 | 9 | 9 |
| GLYMO | 15 | 15 | 15 | 15 |
| Alkoxysilane | 28[1] | 28[2] | 28[3] | 28[4] |
| Polysiloxane | 42 | 42 | 42 | 42 |
| Addition to base compound I in % by wt. | 10 | 10 | 10 | 10 |
| Parameters | | | | |
| TS after 7 days in MPa | 0.98 | 0.96 | 1.01 | 1.02 |
| TS after HWS in MPa | 0.29 | 0.64 | 0.75 | 0.85 |

[1] tetraethoxysilane
[2] propyl triethoxysilane
[3] iso-butyl triethoxysilane
[4] cyclohexenyl ethyl triethoxysilane Table 2 shows the positive effect of the addition of polysiloxane and alkyl alkoxysilane with more alkyl group on the hot water stability.

Examples 9 to 11
Variation of the Resin Incorporation

These examples are cross-linking systems analogous to examples 1 to 4. The polysiloxane (silicone resin) was not incorporated into the cross-linking system, but rather added to the base compound II in accordance with various technologies. Thus the cross-linker does not contain silicone resin. OCTEO was used as the alkyl alkoxysilane.

Table 3 shows the data for incorporation of the resin and the results.

TABLE 3

| | Example 9 | Example 10 | Example 11 | Example 12 |
|---|---|---|---|---|
| Cross-linking components in parts by weight | | | | |
| TPOS | 4 | 4 | 4 | 4 |
| Tin compound | 2 | 2 | 2 | 2 |
| AMEO | 9 | 9 | 9 | 9 |
| GLYMO | 15 | 15 | 15 | 15 |
| OCTEO | 28 | 28 | — | 28 |
| Polysiloxane | — | — | — | 42 |
| Addition to base compound II in % by wt. | 5.8 | 5.8 | 3.0 | 10 |
| Polysiloxane resin | 42[1] | 42[2] | 42[3] | —[4] |
| OCTEO | — | — | 28 | — |
| Addition to base compound II in % by wt. | 4.2 | 4.2 | 7.0 | — |
| Parameters | | | | |
| TS after 7 days in MPa | 0.95 | 0.93 | 0.99 | 0.99 |
| TS after HWS in MPa | 0.83 | 0.87 | 0.78 | 0.89 |

[1] Melting of polysiloxane (melting point 80° C.) in the base compound II
[2] Incorporation of polysiloxane, dissolved in toluene, into the base compound, subsequently removal of the solvent
[3] Incorporation of polysiloxane, dissolved in OCTEO, into the base compound, therefore no OCTEO in the cross-linker
[4] Reaction of polysiloxane with OCTEO in the presence of the tin compound for 2 hours at 160° C., subsequently blending with the other cross-linking components

Examples 13 to 16
Variation of the Polysiloxane

Cross-linkers analogous to examples 1 to 4 were produced, except that different types of polysiloxanes were added. The cross-linking recipe is equivalent to that of example 2.

Table 4 contains the results.

TABLE 4

| | Example 13 | Example 14 | Example 15 | Example 16 |
|---|---|---|---|---|
| Polysiloxane Units | T-funct. | T-funct. | DMQ-funct. | DT-funct. |
| Molecular weight | 9,500 | 1,000 | 1,000 | 8,000 |
| Cross-linker Addition to base compound II in % by wt. | 10 | 10 | 10 | 10 |
| Parameters | | | | |
| TS after 7 days in MPa | 1.00 | 1.04 | 1.01 | 0.93 |
| TS after HWS in MPa | 0.93 | 0.90 | 0.85 | 0.82 |

These examples document the effectiveness of the polysiloxanes over an extremely broad spectrum of their composition.

Examples 17 and 20

Base compound III
120 p/w polydiorganosiloxane with dimethoxymethyl silyl end groups
    Viscosity 50,000 mPas
60 p/w polydiorganosiloxane with trimethyl silyl end groups
    Viscosity 1,000 mPas
10 p/w methyl trimethoxysilane
5 p/w titanium chelate
20 p/w fumed silica
350 p/w precipitated calcium carbonate Base compound IV
100 p/w polydiorganosiloxane with hydroxyl end groups
    Viscosity 50,000 mPas
35 p/w polydiorganosiloxane with trimethyl silyl end groups
    Viscosity 1,000 mPas
15 p/w methyl tris(dimethyl ketoximo)silane
0.3 p/w dibutyl tin dilaurate
10 p/w fumed silica
70 p/w precipitated calcium carbonate The one component systems cured over six weeks at room temperature. Table 5 shows the results.

TABLE 5

| | Example 17 | Example 18 | Example 19 | Example 20 |
|---|---|---|---|---|
| Composition in parts by weight | | | | |
| AMEO | 9 | — | 9 | — |
| GLYMO | 15 | — | 15 | — |
| OCTEO | 28 | — | 28 | — |
| Polysiloxane analogous | 42 | — | 42 | — |
| Addition to base compound III in % by wt. | 3 | — | — | — |
| Addition to base compound IV in % by wt. | — | — | 3 | — |
| Parameters | | | | |
| TS after 6 weeks in MPa | 0.25 | 0.23 | 0.30 | 0.29 |
| TS after HWS in MPa | 0.24 | 0.17 | 0.29 | 0.21 |

The results show that even in the case of one-component systems the additions according to the invention have a positive effect on the hot water stability.

German Priority Application No. P 196 16 789 filed Apr. 26, 1996 is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A non-aqueous adhesive silicone rubber composition, comprising:

(i) 30 to 90% by wt. of at least one polydiorganosiloxane, which can be vulcanized through condensation and has the general formula

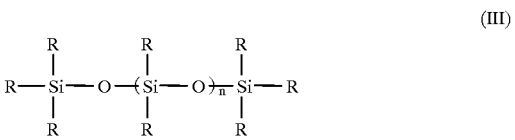

(III)

where each R is, independently of one another, a substituted or nonsubstituted saturated or unsaturated, monovalent hydrocarbon group having 1 to 10 carbon atoms; or denotes OR, wherein R is as above defined, or OH, provided, that on average each molecule contains at least one hydrolyzable group, and n is a value between 5 and 50,000, (k) 1 to 10% by wt. of at least one cross-linker of the general formula

(IV), where R has the aforementioned meaning, $R^5$ stands for hydrocarbon groups having 1 to 6 carbon atoms and X stands for a hydrolyzable group; and a has a value from 0 to 2, and/or their partial condensates, (l) 0.02 to 5% by wt. of at least one bonding agent of the general formula

(V), where each $R^1$ is, independently of one another, a substituted or nonsubstituted, saturated or unsaturated linear, branched or cyclic hydrocarbon group having at least 3 carbon atoms, $R^6$ contains at least one Si-C bonded group having an adhesion-promoting radical selected from the group consisting of an amino, epoxy, mercapto and acrylate radical, and c is a value 0 to 2, d is either 1 or 2, and the sum (c+d) is not greater than 3, and/or their partial condensates, (m) 0.01 to 3% by wt. of at least one compound catalyzing the reaction of the components (i) to (1), (n) 5 to 50% by wt. of at least one treated and/or untreated filler, and a hot water stability improvement effective amount of a combination of (a) at least one organosilicon compound of the formula

(I), where R and $R^1$ have the aforementioned meanings, respectively, X is a hydrolyzable group; a has a value from 0 to 2; and the sum (a+b) has a value between 1 to 3; or their partial condensates; and (b) at least one branched organosilicon compound of formula $$(SiO_{4/2})_x(R^3SiO_{3/2})_y(R^3{}_2SiO_{2/2})_z(R^3{}_3SiO_{1/2})_w \quad (II),$$

where each $R^3$ denotes, independently of one another, R, OR or OH; and the sum (x+y+z+w) has a greater value than 2, and/or (c) a product obtained by reacting at least one compound of formula (I) with at least one compound of the formula (II), wherein (a) and (b) and/or (c) comprises 0.1% by wt. to 30% by wt. based on the total mixture.

2. The composition of claim 1, wherein $R^1$ is selected from the group consisting of propyl, butyl, isobutyl, octyl, cyclohexenyl and combinations thereof.

3. The composition of claim 1, wherein the compound formula (I) has the structure $R^1Si(OR^4)_3$, where $R^4$ is a hydrocarbon group having 1 to 4 carbon atoms.

4. The composition of claim 1, wherein said organosilicon compound of formula (II) is a condensation product of an alkyl trialkoxysilane in which the alkyl group has 1 to 4 carbon atoms.

5. The composition of claim 1, wherein said organosilicon compound of formula (II) comprises units of the structure $(R^3{}_3SiO_{1/2})$ and $(SiO_{4/2})$, where $R^3$ is R, OR and/or OH.

6. The composition of claim 1, wherein said organosilicon compound of formula (II) comprises units of the structure $(R^3{}_3SiO_{1/2})$, $(SiO_{4/2})$ and $(R^3{}_2SiO_{2/2})$, where $R^3$ is R, OR and/or OH.

7. The composition of claim 1, comprising 1.0 to 3.5% by wt. of compound (a) and 1.5 to 4.0% by wt. of compound (b).

8. The composition of claim 1, comprising 1.0 to 5.0% by wt. of compound (a) and (b) and/or (c), based on the total mixture.

9. The composition of claim 1, wherein in said organosilicon compound of formula (II), x and w are zero, y is between 2 and 100, and z is between 0 and 80.

10. The composition of claim 1, wherein in said organosilicon compound of formula (II), y is zero, x is between 2 and 100, and z is between 0 and 50, and w is between 1 and 100.

* * * * *